F. T. ROBERTS.
PROCESS OF MAKING RUBBER ARTICLES HAVING CORES AND APPARATUS THEREFOR.
APPLICATION FILED DEC. 29, 1919.
1,387,805.
Patented Aug. 16, 1921.
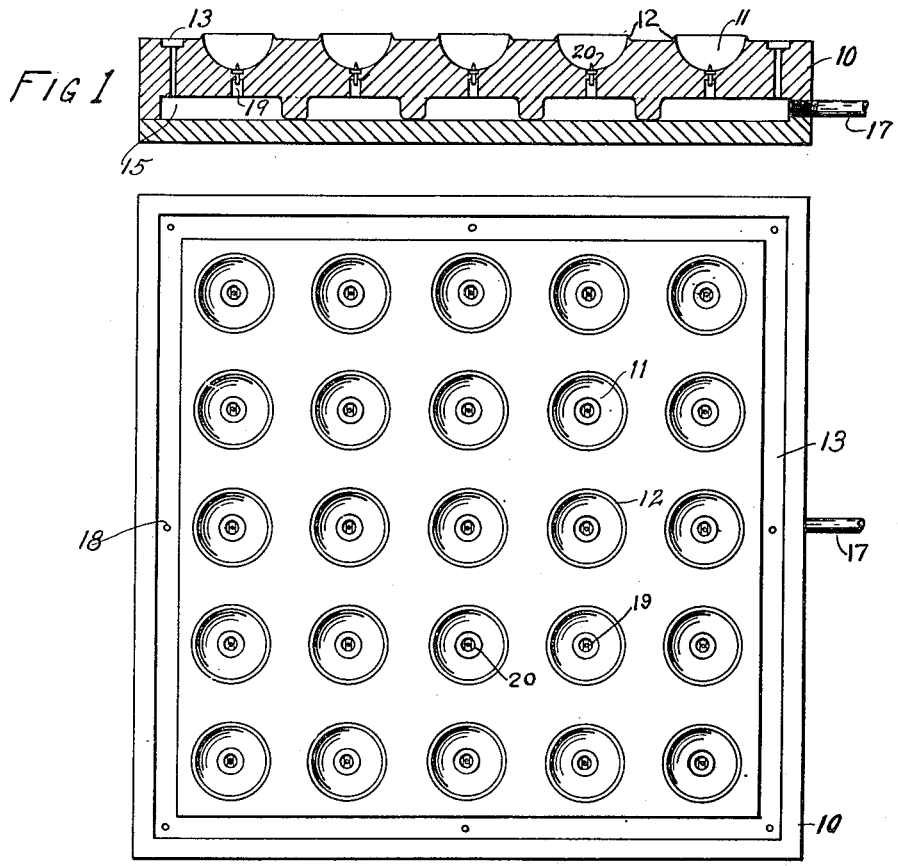
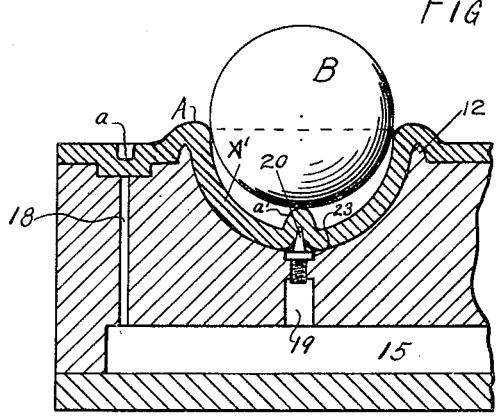
Inventor
Fred Thomas Roberts,
By Bates & Macklin,
Attys.

UNITED STATES PATENT OFFICE.

FRED THOMAS ROBERTS, OF CLEVELAND HEIGHTS, OHIO, ASSIGNOR TO PARAMOUNT RUBBER CONSOLIDATED, INC., OF PHILADELPHIA, PENNSYLVANIA, A CORPORATION OF DELAWARE.

PROCESS OF MAKING RUBBER ARTICLES HAVING CORES AND APPARATUS THEREFOR.

1,387,805. Specification of Letters Patent. Patented Aug. 16, 1921.

Application filed December 29, 1919. Serial No. 348,095.

*To all whom it may concern:*

Be it known that I, FRED THOMAS ROBERTS, a citizen of the United States, residing at Cleveland Heights, in the county of Cuyahoga and State of Ohio, have invented a certain new and useful Improvement in Processes of Making Rubber Articles Having Cores and Apparatus Therefor, of which the following is a full, clear, and exact description, reference being had to the accompanying drawings.

This invention relates to a method and apparatus for efficiently and rapidly manufacturing closed rubber articles containing cores. An instance of a use of the invention is the manufacture of centers for baseballs, comprising a cork sphere surrounded by a rubber shell.

In addition to rapidity and cheapness of manufacture, which are objects of the present invention, it has also the important feature of substantially exhausting the air between the core and shell, thus insuring a snug and continuous junction, and preventing the formation of blisters between them.

In carrying out my invention, I provide means for pneumatically seating the rubber shell in mold cavities, and then, after a core is placed within the rubber-lined cavities and such cavities brought together, I exhaust the air between the core and shell.

The invention includes the above mentioned steps as a process and also an apparatus which may be employed in performance of such process, all of which is hereinafter more fully explained.

Figure 4:
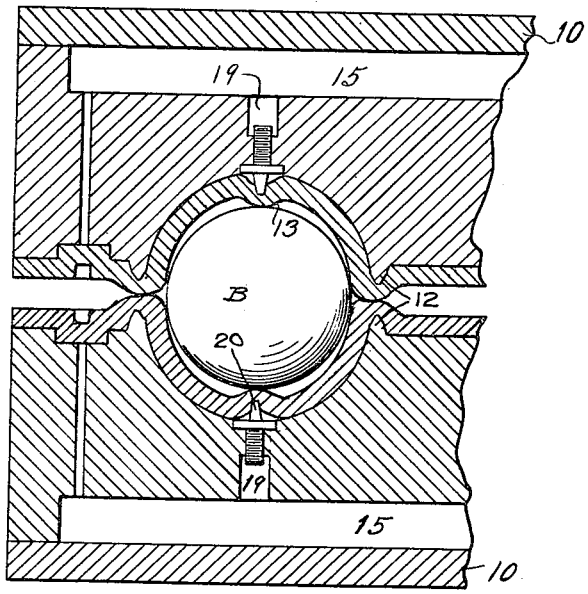
Figure 6:
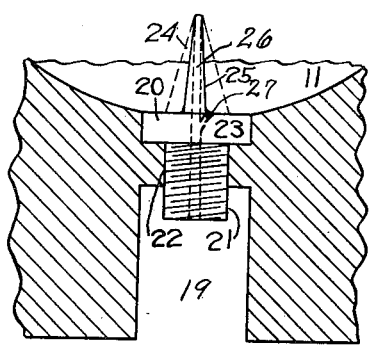
Figure 5:
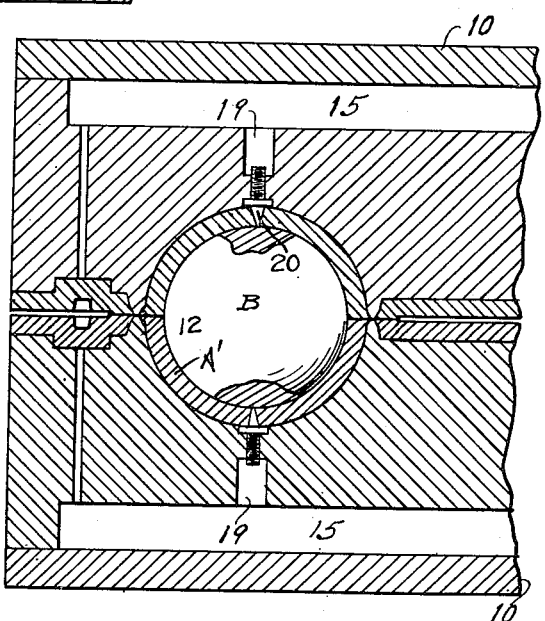
Figure 7:
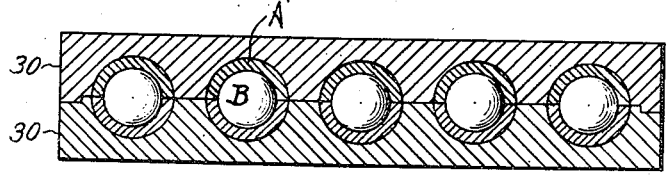

In the drawings, Figure 1 is a vertical cross section of a suction mold for use in performing the process, adapted particularly for the manufacture of base-ball centers; Fig. 2 is a plan of such mold; Fig. 3 is an enlarged vertical section through one of the cavities of the mold, showing the rubber stock seated in the cavity and the core lying loosely therein; Fig. 4 is a vertical section through two coöperating molds after the rubber shell has been completely seated and as the mold members are just coming together; Fig. 5 is a cross section through the two mold members after they have been brought finally together under pressure; Fig. 6 is a much enlarged cross section of the hollow puncturing needle employed; Fig. 7 is a cross section of a suitable vulcanizing mold which may be used in carrying out the final step of the process.

As shown in Figs. 1 to 6 inclusive, 10 indicates a plate or block forming the body of a multiple mold, this block having a series of cavities 11 for the various articles, each cavity being surrounded by an annular cutting rib 12 and the whole series of cavities being surrounded by grooves 13 in the face of the block. Each cavity 11 and the groove 13 are in communication with a suction chamber 15 in the base of the mold from which leads a suitable exhaust pipe 17. The connection between the grooves 13 and the suction chamber is simply by occasional holes 18. The connection between each cavity and the suction chamber involves a hole 19 through the body of the block and a peculiar hollow needle 20 occupying the cavity-end of this hole and projecting into the cavity, as hereinafter explained.

The hollow needle 20 is so arranged in the base of each mold cavity that it provides for two suction connections to the cavity, one at the extreme base of the cavity and the other at or near the point of the needle, which projects into the cavity. As shown on an enlarged scale in Fig. 6, the needle may have a threaded shank 21 screwed into a threaded enlargement 22 of the hole 19, and may have a collar 23 snugly occupying a recess in the base of the cavity above the collar. The needle is shown as extending in a conical form, (indicated by dotted lines 24) flattened on opposite sides 25, such flattening providing for the convenient application of a wrench for screwing the needle into or out of place. A bore 26 extends axially through the needle from end to end, and a lateral opening 27 extends into this bore from the exposed face of the collar immediately adjacent to one of the flattened sides of the needle. It will be seen from this construction that air may be exhausted from a cavity at the point of the needle and also immediately adjacent to the surface of the cavity, the purpose of which will be hereinafter apparent.

In the operation of my process, a sheet of rubber is laid across the face of the mold member, and then pressed down somewhat into the annular groove 13, and suction applied to the chamber 19, this suction acting in the groove 13 to draw the rubber into the groove, making a tight connection between the rubber and the mold entirely around the cavities. In Fig. 3, A indicates the rubber sheet, and $a$ the portion thereof seated in the vacuum groove. The suction from the needle exhausts the air from the cavity so that the rubber sinks down into it into close contact with the wall of the cavity, as at A', except at the needle where the rubber passes across the point of the needle. The suction through the point of the needle is not sufficient to cause the rubber to be punctured by the needle so that the rubber lining of the cavity extends upwardly at the base portion across the point of the needle but otherwise snugly fits the wall of the cavity, as illustrated by the rubber portion $a'$ in Fig. 3.

After two sheets of rubber have been seated in two mold members by suction, as described, the ball center is placed in one of the mold members having upwardly facing cavities, as illustrated by the center B in Fig. 3; then the other rubber-lined mold member is placed in inverted position over the cores, as shown in Fig. 4, the suction being maintained throughout this operation. Then the two mold members are brought gradually together under hydraulic pressure while the suction is still maintained. As the portions of the rubber over the annular ribs 12 are coming into engagement the core presses on the inward projection of the rubber $a'$ and causes the needle to puncture it. Fig. 4 shows the position as this puncturing is just taking place. As soon as the mold members are brought firmly together the puncturing has been completed so that there is then a suction connection from the suction chamber 15 through the point of the needle to the space between the rubber core and shell. At the same time the two hemispheres of rubber are joined together in a seam and the surplus stock is sheared off by the annular ribs 12.

By means of the suction through the point of the needle, the air surrounding the core within the shell is immediately exhausted. The completion of the closing movement under hydraulic pressure brings the parts into the position shown in Fig. 5, where the shell is pressed snugly and evenly into contact with the core and the meeting edges of the shell are joined in a seam and the rubber surrounding such seam is cut off by the ribs 12.

After the operation described, the mold members 10 are separated. In such separation one of the needles becomes withdrawn from each finished article, and the article is then removed (manually or otherwise) from the other cavity, being readily withdrawn from the needle thereof. When free from the needles the immediately surrounding rubber closes the opening which was occupied by the needle. The articles are then transferred to any suitable mold and vulcanized.

A vulcanizing mold which may be employed is illustrated in Fig. 7, and comprises two plates 30, each provided with hemispherical cavities. The articles are placed in this mold preferably with their seams out of registration with the meeting plane of the two mold plates, and thus the small external fin, or roughness, at the seam, is lost in the vulcanization, and a smooth uniform hollow spherical shell is produced, containing the spherical core.

It should be noted that the suctional clamping of the rubber sheet to the mold illustrated herein, is claimed in my applications No. 154,072, filed March 12, 1917, for a method of making hollow rubber articles, and No. 221,961, filed March 12, 1918, for molds for hollow rubber articles. The method of pneumatically seating rubber stock and thereafter exhausting the air between it and a second member contacting with it is claimed in my application No. 230,625, filed April 25, 1918, for a process of and apparatus for making hollow rubber articles.

I claim:

1. The method of making rubber articles having cores, comprising seating rubber stock for the shell of the article in two mold cavities, bringing such rubber-lined cavities into conjunction with an interposed core occupying one of the cavities and exhausting the air between the rubber shell and core.

2. The method of making rubber articles having cores, comprising pneumatically seating rubber stock for the shell of the article in two mold cavities, bringing the shells in the cavities into engagement and causing the body of the shell to embrace a core, and during such operation exhausting the air between the rubber shell and core.

3. The method of making rubber articles having cores, comprising seating rubber stock for the shell of the article, placing within such seated stock the core, bringing the rubber-lined cavities into conjunction about the core to join the edges of the shell to each other and shear off the surplus stock around such junction, and during such joining operation exhausting the air from the space between the shell and core.

4. The method of making rubber articles having cores, comprising seating by suction rubber stock for the shell of the article, placing within such seated stock the core, bringing the rubber into engagement at the rims of the cavities to join the edges of the shell to each other and shear off the surplus stock around such junction, and after the edges are abutted exhausting the air from the space between the shell and core.

5. The step in the method of making cored rubber articles comprising exhausting the air between the core and an inclosing shell during the formation of the article.

6. The step in the method of making cored rubber articles comprising exhausting the air between the core and shell after the shell has completely inclosed the core and while it is being pressed into snug surface engagement therewith.

7. The method of making cored rubber articles comprising forming a shell in cup shaped portions and bringing such portions into edge engagement about an internal core, and during the operation exhausting the air between the core and shell.

8. The method of making cored rubber articles comprising forming the shell in a series of depressions in a rubber sheet, bringing two of such sheets into engagement around the edges of the depressions and about an internal core, and during the operation shearing off the surplus stock around the abutting edges and exhausting the air between the core and shell.

9. The method of making rubber articles comprising seating rubber in mold cavities, such cavities being provided with hollow needles extending into them, which needles have openings closed by the rubber when it is thus seated, and thereafter forcing a core into engagement with the rubber and thus causing the needle to puncture the rubber, suction acting on the space between the core and rubber after such puncturing.

10. The method of making cored rubber articles consisting of seating rubber sheets in mold cavities by suction, such cavities being provided with hollow needles extending into them, which needles have openings closed by the rubber when it is thus seated, and thereafter forcing the core into engagement with the rubber and thus causing the needle to puncture the rubber, the suction being continued after such puncturing, and acting through the needle on the space between the rubber and core.

11. The method of making rubber articles having cores, comprising pneumatically seating rubber stock for the shell of the article in two mold cavities, bringing the shells in the cavities into engagement and causing the body of the shell to embrace a core, and thereafter transferring the article to another mold and vulcanizing it.

12. The method of making cored rubber articles comprising forming a series of depressions in a rubber sheet, bringing two of such sheets into engagement around the edges of the depressions and about an internal core, and during the operation shearing off the surplus stock around the abutting edges and exhausting air between the core and shell, then transferring the core-covered article to another mold and vulcanizing it.

13. The method of making rubber articles comprising seating rubber in mold cavities, such cavities being provided with hollow needles extending into them, which needles have openings closed by the rubber when it is thus seated, thereafter forcing a core into engagement with the rubber and thus causing the needle to puncture the rubber, exhausting air from the space between the core and rubber after such puncturing, and then transferring the article to another mold and vulcanizing it.

14. An apparatus for making rubber articles consisting of a mold member having a cavity, a hollow needle extending into said cavity, means for establishing suction through the needle adjacent to its point, and means for establishing suction from the cavity independently of the point of the needle.

15. The combination of a pair of coacting mold members, each having a cavity surrounded by a cutting rib, a hollow needle carried by each member and extending into its cavity, means for establishing suction through the needles adjacent to their points, and means for establishing suction from the cavities independently of the points of the needle.

16. The combination of a mold member having a cavity, a hollow needle extending into the cavity, a suction passageway communicating with the cavity through the hollow needle, and a suction passageway communicating with the mold cavity adjacent to the surface of the cavity.

17. The combination of a mold member having a cavity, a hollow needle extending into the cavity, a suction passageway communicating with the cavity through the point of the hollow needle, and an additional suction passageway communicating with the mold cavity adjacent to the base of the needle.

18. The combination of a mold member having a cavity, a suction chamber in the mold member, a passageway from said chamber to the cavity, a hollow needle occupying such passageway and extending into the cavity, there being additional communication between the suction chamber and cavity opening adjacent to the base of the cavity.

19. The combination of a pair of coacting mold members having a cavity surrounded by an annular cutting edge, a suction chamber in each mold member, a passageway from each of said chambers to the cavity of the mold member, a hollow needle occupying such passageway and extending into the cavity, there being additional communication between the passageway and cavity opening adjacent to the base of the cavity.

20. The combination of a mold member having a cavity, and passageway to the cavity, a hollow needle occupying said passageway and extending into the cavity having a bore through it, and a lateral opening into such bore adjacent to the surface of the cavity.

21. The combination of a mold member having a cavity, a suction chamber, a passageway from the suction chamber to the cavity, a hollow needle occupying said passageway and extending into the cavity having a bore through it longitudinally, and a lateral passage from such bore to the exterior of the needle adjacent to the surface of the cavity.

22. The combination of a mold having a cavity, a passageway leading thereto, a hollow needle screwing into such passageway and extending into the mold cavity and having an opening adjacent to its point, and means for exhausting the air from the cavity independently of the opening at the point of the needle.

23. The combination of a mold member having a cavity, a passageway to the cavity, a hollow needle having a screw-threaded shank threaded into the portion of the passageway adjacent to the cavity, said needle extending into the cavity and having an opening adjacent to its point and a lateral opening in the side wall of the needle adjacent to its base and communicating with the bore thereof.

24. The combination of a mold having a cavity, a suction passageway leading therefrom, a hollow needle having a shank occupying said passageway and having a collar adapted to engage the mold member, and a lateral opening through the needle beyond the collar into the bore of the needle.

25. The combination of a mold having a cavity, a suction passageway leading therefrom, a hollow needle having a threaded shank screwing into said passageway, the side of said needle being flattened, and a lateral opening at the base of such flattened portion into the bore of the needle.

26. The combination of a mold member having a series of cavities therein, each surrounded by an annular cutting rib, a suction chamber, a series of passageways from the various cavities to the suction chamber, and hollow needles occupying the various passageways and extending into the cavities, said needles having openings adjacent to their points, and there being additional suction passageways to the suction chamber from the cavities adjacent to the walls thereof and independently of the points of the needles.

In testimony whereof, I hereunto affix my signature.

FRED THOMAS ROBERTS.